No. 729,492. PATENTED MAY 26, 1903.
J. B. HANNAY.
APPARATUS FOR MANUFACTURING WHITE PIGMENT.
APPLICATION FILED OCT. 10, 1902.
NO MODEL. 2 SHEETS—SHEET 2.

WITNESSES:
Edward W. Cox
Annie F. Richardson

Inventor:
JAMES BALLANTYNE HANNAY.
By
ATTORNEY.

No. 729,492. Patented May 26, 1903.

UNITED STATES PATENT OFFICE.

JAMES BALLANTYNE HANNAY, OF LOCH LONG, SCOTLAND.

APPARATUS FOR MANUFACTURING WHITE PIGMENT.

SPECIFICATION forming part of Letters Patent No. 729,492, dated May 26, 1903.

Original application filed August 30, 1901, Serial No. 73,871. Divided and this application filed October 10, 1902. Serial No. 126,798. (No model.)

*To all whom it may concern:*

Be it known that I, JAMES BALLANTYNE HANNAY, a subject of the King of Great Britain and Ireland, residing at Cove Castle, Loch Long, in the county of Dumbarton, Scotland, have invented a certain new and useful Apparatus for Manufacturing White Pigment, (for which I have made application for Letters Patent in Germany, No. H. 27,103, dated November 29, 1901; in Germany, No. H. 27,641, dated February 28, 1902; in Germany, dated August 21, 1902; in France, No. 316,708, dated December 9, 1901; in Belgium, No. 160,480, dated December 21, 1901; in Austria, dated January 20, 1902; in Italy, No. 43, Vol. 152, dated March 31, 1902; in Sweden, No. 116/02, dated January 21, 1902; in Norway, No. 14,732, dated January 24, 1902; in Hungary, No. 24,438, dated January 25, 1902; in Luxemburg, No. 4,672, dated January 22, 1902; in Switzerland, No. 28,604, dated January 27, 1902; in Spain, No. 29,189, dated June 6, 1902; in Russia, No. 16,215, dated January 15/28, 1902; in Turkey, No. 999, dated January 30, 1902; in Canada, No. 98,597, dated February 8, 1902; in Victoria, No. 19,005, dated February 26, 1902; in New South Wales, No. 11,809, dated February 27, 1902; in Portugal, No. 3,900, dated June 23, 1902, and in Great Britain, No. 2,297, dated February 1, 1901,) of which the following is a specification.

My invention relates to apparatus used in the manufacture of white pigment of basic sulfate of lead from galena or other sulfid-of-lead ore by furnacing operations.

The object of my invention is to effect improvements in the apparatus employed in the manufacture of white pigment in this way.

My invention consists in details of the cooling or condensing and collecting arrangements, whereby the separation of the condensed lead sulfate from the condensers and collectors is facilitated.

Figure 1:
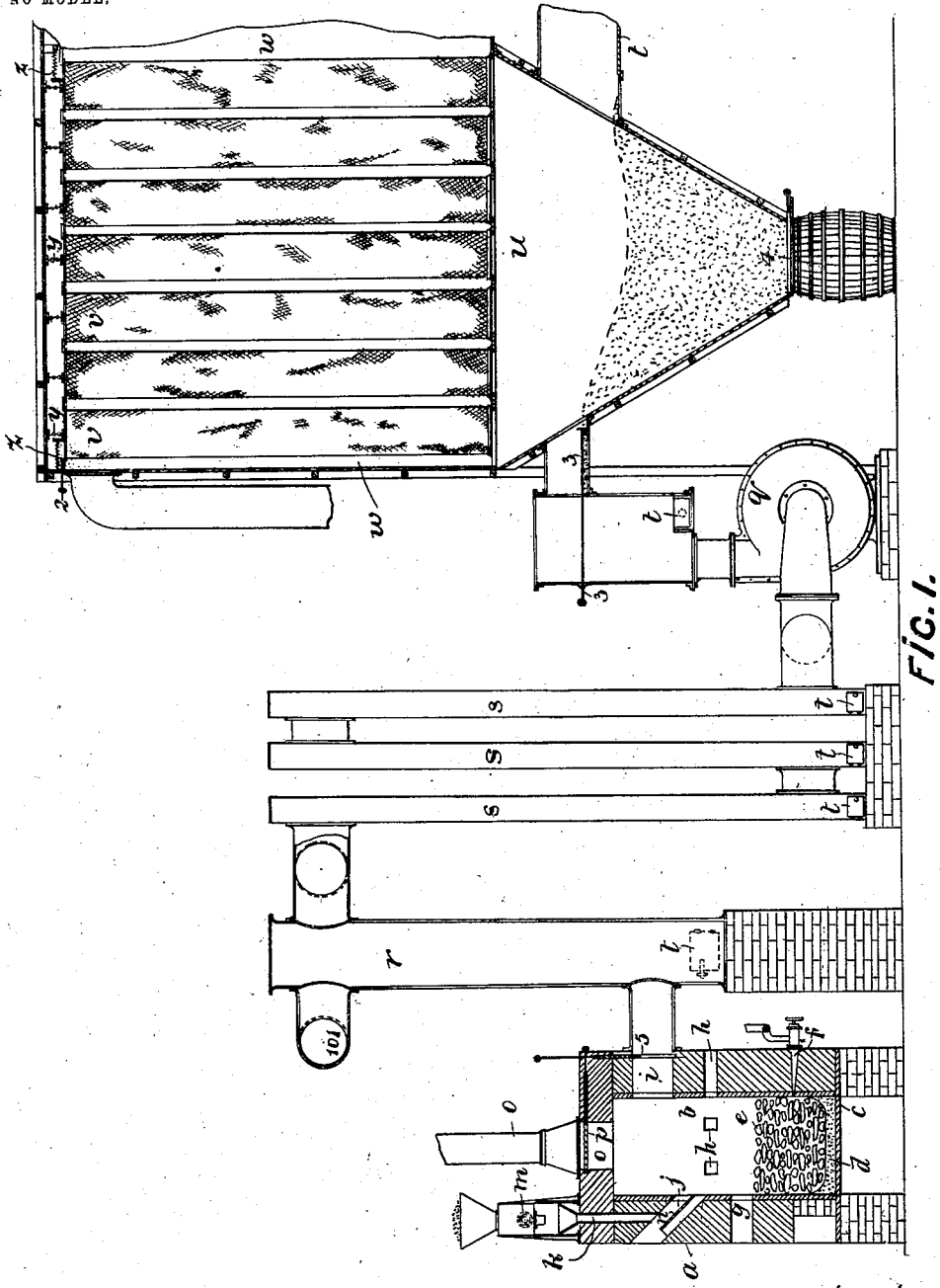
Figure 2:
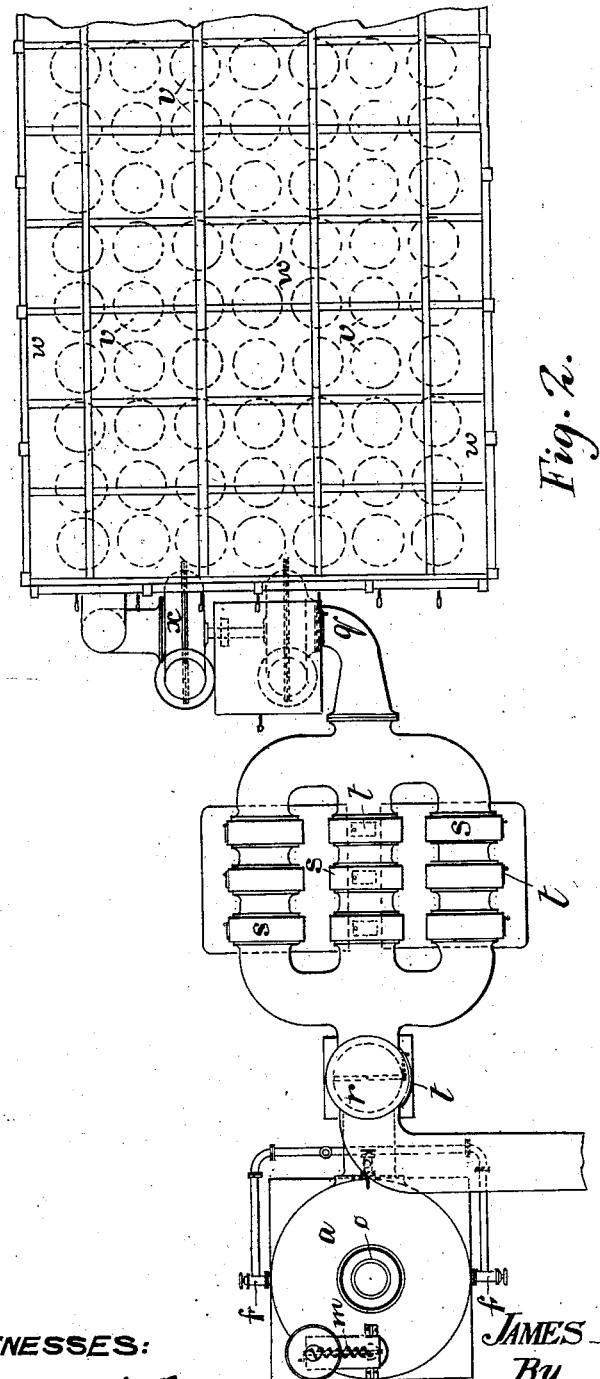

Referring to the accompanying drawings, Figure 1 is a sectional elevation of my improved apparatus. Fig. 2 is a plan of the same.

In carrying my invention into effect I construct a cylindrical furnace $a$ with a basic-lined cylindrical interior $b$. Preferably I use the common magnesia and lime basic material as employed in the basic-steel process. I line the furnace with this basic material made into suitable bricks or by ramming it around a central core. On the plate-iron bottom $c$ of the furnace is placed a layer of coke breeze $d$ and a pile of coke slabs $e$. Three twyers $f$ enter the furnace at about twenty inches below the top surface of the coke $e$, which is built up to the level of an air-inlet $g$, other air-inlets $h$ being provided farther up the furnace. A conveyer or other device $m$ feeds the galena down a vertical passage $k$, opening into an inclined pipe $j$, in which is a suitably curved and inclined plate $n$ for distributing the galena evenly over the coke. At the top of the furnace is a chimney $o$, fitted with a damper $p$ for use when starting the furnace. An exit $i$ for the fume, also fitted with a damper 5, connects the furnace with a dust-box $r$, leading to coolers $s$ $s$, consisting of long vertical sheet-iron boxes or chambers connected alternately at the top and bottom, as shown. In order that these coolers may be readily set into vibration to prevent condensed pigment from adhering to them, I make the coolers with thin practically flat sides. I find a rectangular section of cooler-tube very suitable. From the top of the dust-box $r$ a valve-controlled branch pipe 101 leads to a fan and condenser, which is common to a number of furnaces and is used to draw discolored fume when accidentally produced. Doors or drawers $t$ are arranged at the bottom of the coolers $s$ for the removal of any condensed fume which may be deposited on the walls of the coolers $s$ and which is separated from the walls by striking or otherwise vibrating the latter. In general the vibration produced by the fans is sufficient to prevent the accumulation of condensed pigment on the walls of the coolers $s$. A fan $q$ draws the fume from the furnace through the dust-box $r$ and coolers $s$ and delivers it into hoppers $u$ $u$, above which are arranged a number of flannel-cloth bags $v$, through which the air and other gases are drawn to a chamber $w$, surrounding the bags, by a fan $x$. Each bag is suspended from the top of the chamber $w$ by a chain $y$, attached to the plate forming the top of the bag. The bags are arranged in rows together and attached by spring connections $z$ to the sides and top of the chamber $w$. By oscillating one plate at the end of a row by a handle or other device 2 the whole row is oscillated and the white pigment shaken down, or in some cases the shaking may be effected by mechanism.

Suitable doors or drawers $t$ and, if necessary, scrapers 3 are provided at various points of the apparatus for the removal of deposit, and the hoppers $u$ are fitted with discharge-doors 4.

Having now described my invention, what I claim as new, and desire to secure by Letters Patent, is—

1. In apparatus for the production of white pigment in which the condensed pigment is collected on cloth bags suspended in a chamber, the combination of plates forming the tops of the bags, links connecting adjacent plates together to form a row, and a rod connected to one of the plates and provided with a handle outside the chamber, whereby when the handle is moved vertically a rocking motion of the plates forming the tops of the bags is produced.

2. In apparatus for the production of white pigment in which the condensed pigment is collected on cloth bags suspended in a chamber, the combination of plates forming the tops of the bags and flexibly suspended from the roof of the chamber, links connecting adjacent plates together to form a row, a rod connected to one of the plates and provided with a handle outside the chamber, and a spring connected to the wall of the chamber and to one of the plates, whereby when the handle is moved horizontally the row of bags is oscillated against the control of the spring, substantially as described.

In witness whereof I have hereunto set my hand in presence of two witnesses.

JAMES BALLANTYNE HANNAY.

Witnesses:
 FRANCIS JAMES BIGNELL,
 BERTRAM H. T. MATTHEWS.